US012613939B2

(12) United States Patent
Tanno et al.

(10) Patent No.: US 12,613,939 B2
(45) Date of Patent: Apr. 28, 2026

(54) CORRECTING A MACHINE LEARNING MODEL

(71) Applicant: Microsoft Technology Licensing, LLC, Redmond, WA (US)

(72) Inventors: Ryutaro Tanno, Cambridge (GB); Aditya Nori, Cambridge (GB); Melanie Fernandez Pradier, Cambridge (GB); Yingzhen Li, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 848 days.

(21) Appl. No.: 17/936,677

(22) Filed: Sep. 29, 2022

(65) Prior Publication Data

US 2023/0409674 A1 Dec. 21, 2023

Related U.S. Application Data

(60) Provisional application No. 63/353,520, filed on Jun. 17, 2022.

(51) Int. Cl.
| *G06N 20/00* | (2019.01) |
| *G06F 18/21* | (2023.01) |
| *G06F 18/211* | (2023.01) |

(52) U.S. Cl.
CPC ........ *G06F 18/2193* (2023.01); *G06F 18/211* (2023.01); *G06N 20/00* (2019.01)

(58) Field of Classification Search
CPC ...... G06N 20/00; G06N 3/0464; G06N 3/047; G06N 3/084; G06N 3/09; G06F 18/2193; G06F 18/211; G06F 18/217
See application file for complete search history.

(56) References Cited

U.S. PATENT DOCUMENTS

| 10,990,901 | B2 | 4/2021 | Deo et al. | |
| 11,132,584 | B2 | 9/2021 | Challis et al. | |
| 11,288,115 | B1 | 3/2022 | Katsis et al. | |
| 11,887,003 | B1 * | 1/2024 | Bopardikar | G06N 20/00 |
| 2019/0236482 | A1 * | 8/2019 | Desjardins | G06N 3/09 |
| 2020/0005148 | A1 | 1/2020 | Nori et al. | |
| 2021/0064700 | A1 * | 3/2021 | Gopalan | G06N 20/00 |
| 2021/0256420 | A1 | 8/2021 | Elisha et al. | |
| 2021/0357779 | A1 | 11/2021 | Kabra et al. | |

(Continued)

OTHER PUBLICATIONS

"Amazon SageMaker Debugger", Retrieved from: https://web.archive.org/web/20221005195418/http://aws.amazon.com/sagemaker/debugger/, Oct. 5, 2022, 8 Pages.

(Continued)

*Primary Examiner* — Dave Misir
(74) *Attorney, Agent, or Firm* — Barta Jones, PLLC

(57) ABSTRACT

A computer-implemented method includes receiving an incorrect prediction output by a trained machine learning model, which has been trained using training data items. The method includes identifying a training data item used to train the model that is a cause of the incorrect prediction, by determining an impact on performance of the trained machine learning model associated with removing the training data item from the plurality of training data. The trained model can then be updated to remove the effect of the identified training data item, allowing the model to be automatically corrected in view of poor quality training data.

20 Claims, 3 Drawing Sheets

(56) References Cited

U.S. PATENT DOCUMENTS

2022/0269991 A1* 8/2022 Kurokawa .............. G06N 20/00
2022/0383152 A1* 12/2022 Kallur Palli Kumar .....................
                                    G06N 7/01
2024/0403715 A1* 12/2024 Wang ................. G06Q 30/0248

OTHER PUBLICATIONS

"AutoML", Retrieved from: https://web.archive.org/web/20220830122953/https://www.microsoft.com/en-us/research/project/automl/, Aug. 30, 2022, 2 Pages.

Agarwal, et al., "Second Order Stochastic Optimization in Linear Time", In Journal of Stat, vol. 1050, Feb. 15, 2016, 27 Pages.

Amari, Shun-Ichi, "Natural Gradient Works Efficiently in Learning", In Journal of Neural Computation, vol. 10, Issue 2, Feb. 15, 1998, pp. 251-276.

Ancona, et al., "Explaining Deep Neural Networks with A Polynomial Time Algorithm for Shapley Value Approximation", In Proceedings of International Conference on Machine Learning, May 24, 2019, 10 Pages.

Barshan, et al., "Relatif: Identifying Explanatory Training Examples Via Relative Influence", In Repository of arXiv:2003.11630v1, Mar. 25, 2020, 18 Pages.

Bourtoule, et al., "Machine Unlearning", In Repository of arXiv:1912.03817v1, Dec. 9, 2019, 16 Pages.

Cao, et al., "Editing Factual Knowledge in Language Models", In Repository of arXiv:2104.08164v2, Sep. 8, 2021, 16 Pages.

Chakarov, et al., "Debugging Machine Learning Tasks", In Repository of arXiv:1603.07292v1, Mar. 23, 2016, 29 Pages.

Chen, et al., "Why is My Classifier Discriminatory?", In Proceedings of Advances in Neural Information Processing Systems, Dec. 3, 2018, 12 Pages.

Farajtabar, et al., "Orthogonal Gradient Descent for Continual Learning", In Proceedings of International Conference on Artificial Intelligence and Statistics, Aug. 26, 2020, 11 Pages.

Finn, et al., "Model-Agnostic Meta-Learning for Fast Adaptation of Deep Networks", In Proceedings of International conference on machine learning, Aug. 6, 2017, 10 Pages.

Frenay, et al., "Classification in the Presence of Label Noise: A Survey", In Journal of IEEE Transactions on Neural Networks and Learning Systems vol. 25, Issue 5, May 2014, pp. 845-869.

Ghorbani, et al., "Data Shapley: Equitable Valuation of Data For Machine Learning", In Proceedings of 36th International Conference on Machine Learning, Jun. 9, 2019, 10 Pages.

Ginart, et al., "Making AI Forget You: Data Deletion in Machine Learning", In Proceedings of Advances in Neural Information Processing Systems, Dec. 8, 2019, 14 Pages.

Giordano, et al., "A Swiss Army Infinitesimal Jackknife", In Proceedings of the 22nd International Conference on Artificial Intelligence and Statistics, Apr. 16, 2019, 9 Pages.

Gish, et al., "Towards a New Understanding of the Training of Neural Networks with Mislabeled Training Data", In Repository of arXiv:1909.09136v1, Sep. 18, 2019, 13 Pages.

Goodfellow, et al., "Explaining and Harnessing Adversarial Examples", In Repository of arXiv:1412.6572v1, Dec. 20, 2014, 10 Pages.

Guo, et al., "Certified Data Removal from Machine Learning Models", In Repository of arXiv:1911.03030v1, Nov. 8, 2019, 14 Pages.

Gupta, et al., "Adaptive Machine Unlearning", In Repository of arXiv:2106.04378v1, Jun. 8, 2021, 25 Pages.

Hara, et al., "Data Cleansing for Models Trained with SGD", In Proceedings of Advances in Neural Information Processing Systems, vol. 32, Dec. 8, 2019, 10 Pages.

Hara, Satoshi, "Sgd-Influence", Retrieved from: https://github.com/sato9hara/sgd-influence, Sep. 28, 2020, 2 Pages.

He, et al., "Deep Residual Learning for Image Recognition", In Proceedings of the IEEE Conference on Computer Vision and Pattern Recognition, Jun. 27, 2016, pp. 770-778.

Izzo, et al., "Approximate Data Deletion from Machine Learning Models: Algorithms and Evaluations", In Repository of arXiv:2002.10077v1, Feb. 24, 2020, 20 Pages.

Jia, et al., "Towards Efficient Data Valuation Based on the Shapley Value", In Proceedings of the 22nd International Conference on Artificial Intelligence and Statistics, Apr. 16, 2019, 10 Pages.

Khanna, et al., "Interpreting Black Box Predictions using Fisher Kernels", In Proceedings of the 22nd International Conference on Artificial Intelligence and Statistic, Apr. 11, 2019, 9 Pages.

Kingma, et al., "Adam: A Method for Stochastic Optimization", In Repository of arXiv:1412.6980v1, Dec. 22, 2014, 9 Pages.

Kirkpatricka, et al., "Overcoming Catastrophic Forgetting in Neural Networks", In Proceedings of the National Academy of Sciences, vol. 114, Issue 13, Mar. 14, 2017, pp. 3521-3526.

Koh, et al., "On The Accuracy of Influence Functions for Measuring Group Effects", In Proceedings of Advances in Neural Information Processing Systems, May 2019, 11 Pages.

Koh, et al., "Understanding Black-Box Predictions via Influence Functions", In Proceedings of the 34th International Conference on Machine Learning, vol. 70, Aug. 6, 2017, 10 Pages.

Koh, et al., "Wilds: A Benchmark of in-the-Wild Distribution Shifts", In Proceedings of the 38th International Conference on Machine Learning, Jul. 1, 2021, 28 Pages.

Loo, et al., "Generalized Variational Continual Learning", In Proceedings of International Conference on Learning Representations, Mar. 17, 2021, 46 Pages.

Mitchell, et al., "Fast Model Editing at Scale", In Repository of arXiv:2110.11309v1, Oct. 21, 2021, 17 Pages.

Nag, Avishek, "Bayesian Approach and Model Evaluation", Retrieved from: https://towardsdatascience.com/bayesian-approach-and-model-evaluation-371ad669cf2c, Feb. 3, 2022, 13 Pages.

Neel, et al., "Descent-To-Delete: Gradient-Based Methods for Machine Unlearning", In Repository of arXiv:2007.02923v1, Jul. 6, 2020, 30 Pages.

Nguyen, et al., "Variational Bayesian Unlearning", In Repository of arXiv:2010.12883v1, Oct. 24, 2020, 22 Pages.

Nguyen, et al., "Variational Continual Learning", In Repository of arXiv:1710.10628v1, Oct. 29, 2017, 17 Pages.

Northcutt, et al., "Confident Learning: Estimating Uncertainty in Dataset Labels", In Journal of Artificial Intelligence Research, vol. 70, Apr. 14, 2021, pp. 1373-1411.

Nushi, Besmira, "Responsible Machine Learning with Error Analysis", Retrieved from: https://techcommunity.microsoft.com/t5/ai-machine-learning-blog/responsible-machine-learning-with-error-analysis/ba-p/2141774, Feb. 18, 2021, 12 Pages.

Pan, et al., "Continual Deep Learning by Functional Regularisation of Memorable Past", In Proceedings of the 34th International Conference on Neural Information Processing Systems, Dec. 6, 2020, 12 Pages.

Parisi, et al., "Continual Lifelong Learning with Neural Networks: A Review", In Journal of Neural Networks, vol. 113, May 2019, pp. 54-71.

Sagawa, et al., "Distributionally Robust Neural Networks for Group Shifts: On The Importance of Regularization for Worst-Case Generalization", In Repository of arXiv:1911.08731v1, Nov. 20, 2019, 19 Pages.

Santurkar, et al., "Editing a Classifier by Rewriting its Prediction Rules", In Proceedings of Advances in Neural Information Processing Systems, Dec. 6, 2021, 15 Pages.

Schwarz, et al., "Progress & Compress: A Scalable Framework for Continual Learning", In Proceedings of International Conference on Machine Learning, Jul. 3, 2018, 10 Pages.

Sinitsin, et al., "Editable Neural Networks", In Repository of arXiv:2004.00345v1, Apr. 1, 2020, 12 Pages.

Slack, et al., "Amazon Presents New Method for "Debugging" Machine Learning Models", Retrieved from: https://www.amazon.science/blog/amazon-presents-new-method-for-debugging-machine-learning-models, Dec. 7, 2021, 10 Pages.

Tanno, et al., "Repairing Neural Networks by Leaving the Right Past Behind", In Repository of arXiv:2207.04806v1, Jul. 11, 2022, 19 Pages.

(56)    References Cited

OTHER PUBLICATIONS

Torralba, et al., "Unbiased Look at Dataset Bias", In Proceedings of 24th IEEE Conference on Computer Vision and Pattern Recognition, Jun. 20, 2011, pp. 1521-1528.

Xu, et al., "Adversarial Attacks and Defenses in Images, Graphs and Text: A Review", In International Journal of Automation and Computing, vol. 17, issue 2, Apr. 2020, pp. 151-178.

Zenke, et al., "Continual Learning Through Synaptic Intelligence", In Proceedings of International Conference on Machine Learning, Jul. 17, 2017, 9 Pages.

Zhu, et al., "Modifying Memories in Transformer Models", In Repository of arXiv:2012.00363v1, Dec. 1, 2020, 21 Pages.

* cited by examiner

CORRECTING A MACHINE LEARNING MODEL

CROSS-REFERENCE TO RELATED APPLICATION

This application claims the benefit of U.S. provisional application No. 63/353,520 filed on Jun. 17, 2022, entitled "CORRECTING A MACHINE LEARNING MODEL," the entirety of which is hereby incorporated by reference herein.

BACKGROUND

Supervised machine learning models deployed in industry, such as those employed in computer vision applications or speech processing, typically require large volumes of labelled training data, comprising hundreds of thousands of individual training data items. The process of training a machine learning model on the training data is both memory and processor intensive, and therefore often will require the use of high-performance computing hardware.

The process of obtaining large volumes of accurate labelled training data also requires significant effort. Real-world training data sets often include annotation errors, low-quality inputs, anomalies and acquisition biases, such as demographic imbalances. These issues in the training data may lead to undesirable behaviour of the trained model once deployed.

SUMMARY

According to a first aspect disclosed herein, there is provided a computer-implemented method comprising: receiving an incorrect prediction of a trained machine learning model, the trained machine learning model based on a plurality of training data items; selecting a training data item of the plurality of training data items; calculating an estimate of an impact on performance of the trained machine learning model in respect of the incorrect prediction, the impact caused by removing the selected training data item from the plurality of training data items; determining that the impact on performance indicates an improvement in performance of the trained machine learning model; and identifying the selected training data as a cause of the incorrect prediction based on the calculated estimate of the impact on performance indicating improvement in performance of the trained machine learning model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

In overview, examples of the present disclosure provide a method of identifying training data items that are the cause of prediction errors (also referred to herein as failures) output by a trained machine learning model. Once identified, the trained model may then be updated to remove the effect of the identified training examples. The resultant trained model may be more accurate on the failures whilst retaining its accuracy on other predictions, leading to a model that performs better overall.

By identifying training data items that cause prediction errors, problems associated with poor quality or erroneous training data may be mitigated or resolved. In addition, some of the example methods discussed herein allow the trained model to be corrected without retraining the model entirely, saving time and compute resource and ensuring that the properties of the trained model are retained.

Figure 1:
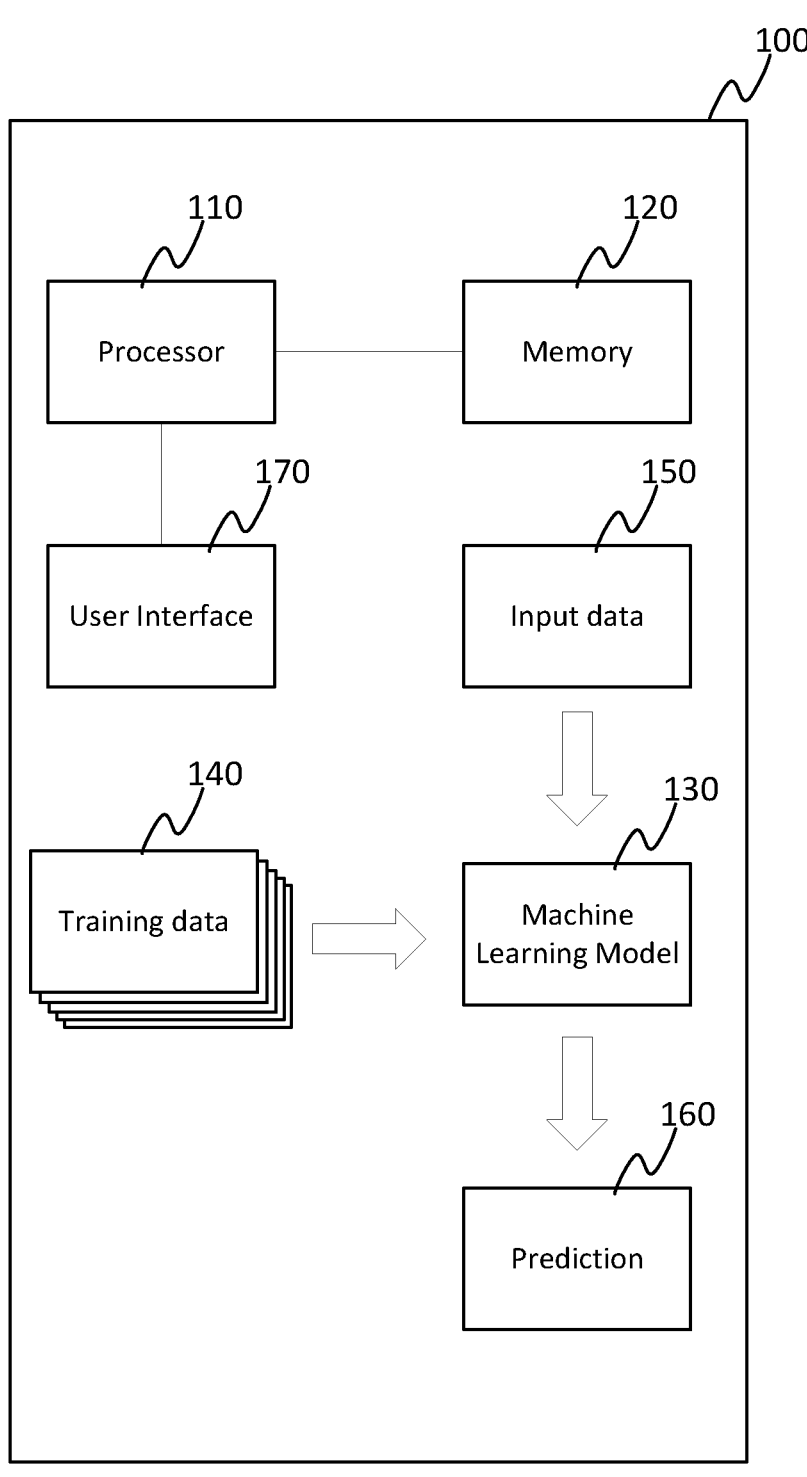
FIG. 1 is a schematic diagram illustrating an example machine learning system.

FIG. 1 illustrates an example machine learning system 100. The machine learning system 100 comprises a processor 110 and a memory 120. In some examples, the machine learning system 100 comprises a user interface 170, which may for example comprise any suitable input and output equipment, including keyboards, mice, monitors or other screens and the like.

The system 100 comprises a machine learning model 130, for example stored in memory 120. The system 100 may be configured to train the machine learning model 130 using training data 140, which may also be stored in the memory 120.

A wide variety of machine learning models 130 may be used in conjunction with the techniques discussed herein. For example, the machine learning model 130 may be a neural network model, such as a convolutional neural network. The machine learning model 130 may alternatively be a logistic regression model or a Bayesian machine learning model. In some examples, the machine learning model 130 is a model that is differentiable. In other words, the function mapping input data received by the model 130 to an output may be a function whose derivative exists at each point in its domain. The techniques may also be applied to models that are not differentiable, but where a posterior distribution (discussed in detail below) can otherwise be calculated or estimated, for example using sampling.

The training data 140 comprises a plurality of labelled data items. For example, in an image processing or computer vision application, the labelled data items may comprise images. In an audio (e.g. speech) processing application, the labelled data items may comprise labelled audio signals. In other examples, the labelled data may comprise graph structures or text.

The system 100 may train the model 130 with the training data 140 using any suitable training algorithm. In the example of a neural network, stochastic gradient descent or Adam (adaptive moment estimation) may be used to train the model 130.

Once trained, the machine learning model 130 is used to output predictions. Use of the trained model 130 in this manner may be described herein as "inference" with the process of the model outputting predictions being referred to as "inference time", to distinguish it from the process of training the model. At inference time, input data 150 (e.g. an input image in the case of a computer vision application) is input to the model 130, which then provides a prediction 160.

The machine learning model 130 may output a posterior probability distribution. The posterior probability distribution (also referred to herein as the "posterior distribution" or "posterior") is a probability distribution, denoted herein as $p(\theta|D)$, where $\theta$ are the model parameters (e.g. the weights in the case of a neural network) and D is the training data 140.

In some examples, the posterior probability distribution forms part of the normal output of the machine learning model 130, or can be readily calculated therefrom. However, in other examples the machine learning model 130 may output values that do not correspond to a probability distribution, in which case the system 100 may estimate the distribution. References herein to calculating the posterior include techniques in which the posterior is estimated or approximated. In one example, the posterior probability distribution may be estimated or computed using one of Maximum Likelihood Estimation (MLE) or Maximum A Posteriori (MAP) point estimates, Laplace approximation or variational inference. In other examples, continual learning methods such as Elastic Weight Consolidation (EWC) can be employed to estimate the posterior probability distribution.

It will be appreciated that the system 100 may be a distributed system comprising a plurality of separate items of computing hardware. For example, the process of training the model 130 may be carried out separately to the inference.

Similarly, the methods and systems disclosed hereinbelow and described in detail with reference to FIG. 2-4 need not be carried out on the same system as the training or inference processes. They may instead be carried out on another computer system comprising one or more processors and memory. Particularly, the methods and systems disclosed hereinbelow with reference to FIG. 2-4 may take predictions 160 output by the model 130 and the trained model 130 itself as inputs, and may not comprise the steps of training the model and performing the inference. In other examples, the methods and systems may comprise performing the inference and/or training the model as discussed above in relation to FIG. 1.

It will be appreciated that the discussion above of the machine learning system 100 is not exhaustive, but is intended to be an outline of the paradigm of supervised machine learning to provide context for the discussion of the techniques herein.

Figure 2:
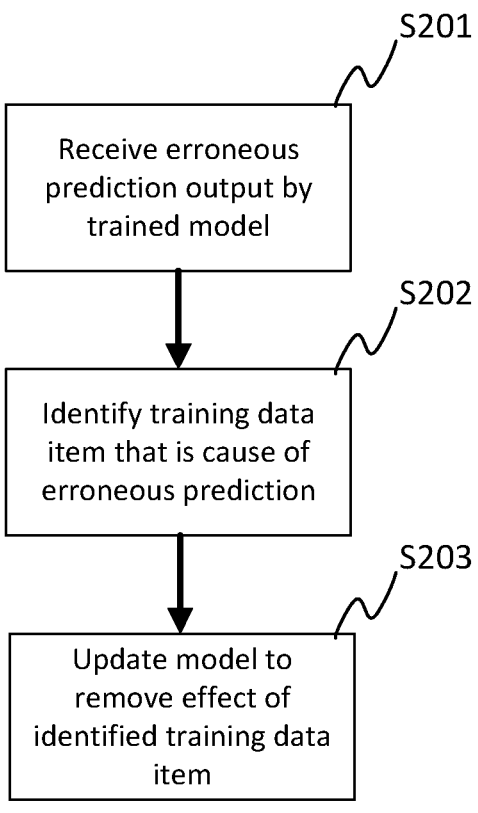
FIG. 2 is a schematic flowchart showing an example method of correcting a machine learning model.
Figure 3:
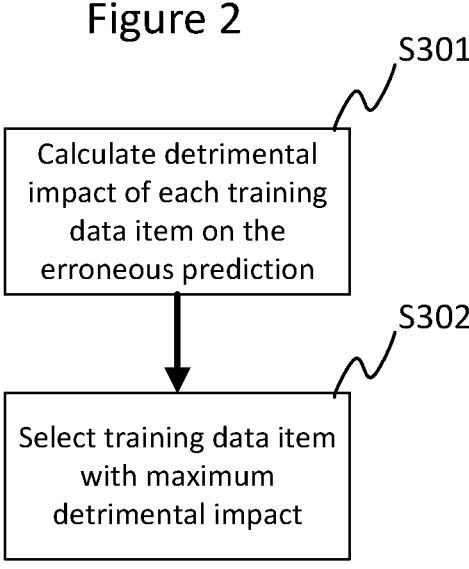
FIG. 3 is a schematic flowchart showing an example method of identifying training data that is a cause of an erroneous prediction.

FIG. 2 illustrates an example method of correcting a machine learning model. In one example, the machine learning model corresponds to the model 130 discussed herein in relation to FIG. 1. The method, and any other methods described herein, may also be executed by the system 100 discussed herein in relation to FIG. 1.

The method comprises a step S201 of receiving an erroneous prediction that has been output by the machine learning model. In some examples, a plurality of erroneous output predictions are received. Particularly, for clarity in the discussion herein, sets or pluralities of erroneous predictions (also referred to as "failure cases" or "failures" or "incorrect predictions") are discussed, but the techniques may equally be applied to a single erroneous prediction.

In one example technique, during the development phase of the machine learning model the model may be tested on test data, for which the correct prediction is known in advance. The test data may be a held-out portion of the data set from which the training data is drawn. Predictions that do not match the label of the test data are erroneous.

In another example, erroneous predictions may be identified by manual examination of unlabelled data. For example, user input via a user interface (e.g. user interface 170) may be employed to identify predictions that are incorrect. In the example of image processing, a user may for example identify an incorrect image segmentation or an erroneous automatic label of an object. This may occur in the context of a deployed system, for example with end users of the system identifying the erroneous predictions.

The method further comprises a step S202 of identifying a training data item that is a cause of the erroneous prediction. In other words, in step S202, a training data item in the training data set used to train the model is identified that has contributed to the erroneous behaviour of the trained model. In some examples, a plurality of training data items are identified. Particularly, for clarity in the discussion herein, sets or pluralities of training data items that are the cause of erroneous predictions (also referred to as "causes") are discussed, but the techniques may equally be applied to a single training data item.

In general, identifying a subset of training data items that are the cause of erroneous predictions is carried out by determining the impact that deleting training data items (i.e. one or more selected training data items) has on the performance of the trained model Particularly, the impact on the posterior probability distribution may be determined. In other words, the posterior probability distribution of the model as trained on all of the training data items is compared to the posterior probability distribution of the model when a candidate subset is removed from the training data. In one example, this comparison can be represented by the following equation:

$$r(C):=\log p(\mathcal{F} \mid \mathcal{D}\backslash\mathcal{C})-\log p(\mathcal{F} \mid \mathcal{D}) \qquad (1)$$

Wherein F is the subset of failure cases, D is the training data used to train the model, C is the subset of the training data D that is removed, and D/C is the training data D with the subset C removed. Equation 1 above provides a quantifiable value r of the impact of deleting the subset C, wherein the magnitude of r indicates the performance improvement obtained by deleting C from the training data D. Accordingly, a large value of r indicates a large improvement of performance, and thus indicates that C has a detrimental impact on performance.

In one example, to identify the subset C of training data that has the greatest impact on performance, and thus can be considered a cause of the erroneous predictions, the subset C with the maximum value of r is identified.

In some examples, it may be possible to exhaustively calculate r for all possible subsets of the training data, to identify the subset that has the maximum r. However, in most examples the number of training data items in the training data will be sufficient that the number of possible subsets will be so large that it is not tractable to compute. In addition, even if the number of subsets was tractable, calculating the posterior for every subset would be computationally expensive.

Therefore, in one example technique, the impact of a subset C is estimated in a manner that allows it to be efficiently calculated, saving computational resource and memory usage. FIG. 3 illustrates this process in more detail.

In step S301, the detrimental impact of each training data item in the training set on the erroneous predictions is calculated.

In step S302, a subset of the training data items that has the maximum detrimental impact on the erroneous predictions are selected. For example, the top K training data items may be selected, wherein K may be 1, 5, 10, 100, 1000 or any other suitable value. In one example, the value of K is selected based on the size of the training data set. For example, in a large training data set containing hundreds of thousands or millions of training data items, selecting a relatively large value of K (e.g. 100 or more) may be appropriate. In another example, if a training data set is known to be of relatively poor quality, increasing the likelihood that there are examples that are contributing to failures, it may also be appropriate to select a large value of K. Conversely, smaller values may be appropriate for well-curated and/or smaller training data sets.

In other examples, all training data items having a detrimental impact over a predetermined threshold value are selected.

Returning to step S301, the value log $p(\mathcal{F} \mid \mathcal{D} \backslash \mathcal{C})$ can be rewritten as follows using Bayes' rule:

$$\log p(\mathcal{F} \mid \mathcal{D}\backslash C) =$$
$$\log \int p(\mathcal{F} \mid \theta) p(\theta \mid \mathcal{D}\backslash C) d\theta = \log \int \frac{p(\mathcal{F} \mid \theta)}{p(C \mid \theta)} \frac{p(\mathcal{D} \mid \theta) p(\theta)}{p(\mathcal{D})} d\theta - \log \frac{p(\mathcal{D}\backslash C)}{p(\mathcal{D})}$$

On the basis that:

$$p(\mathcal{D}\backslash C)/p(\mathcal{D}) = \int \frac{1}{p(C \mid \theta)} \frac{p(\mathcal{D} \mid \theta) p(\theta)}{p(\mathcal{D})} d\theta$$

Equation (1) above can be reformulated as:

$$r(C) = \log \int \frac{p(\theta \mid \mathcal{D}, \mathcal{F})}{p(C \mid \theta)} d\theta - \log \int \frac{p(\theta \mid \mathcal{D})}{p(C \mid \theta)} d\theta \qquad (2)$$

In this reformulation, the posterior p(θ|D/C) does not need to be calculated, and instead the only additional posterior calculated is the posterior p(θ|D, F)—i.e. the posterior calculated by including the failure cases in the training data D. This can therefore be calculated only once, and does not have to be calculated for each subset C.

As discussed above, in order to avoid exhaustively searching all possible subsets C, r(C) can be approximated by calculating the detrimental impact of each training item in the training data. The detrimental impact of each training item can be calculated in parallel.

This may be accomplished by linear approximation of equation (2) above. For example, by applying a first order Taylor series approximation, equation (2) can be rewritten as follows:

$$r(\mathcal{C}) = F(1, p(\theta \mid \mathcal{D}, \mathcal{F})) - F(1, p(\theta \mid \mathcal{D})) \qquad (3)$$

$$F(\epsilon, g(\theta)) := \log \int g(\theta) e^{-\epsilon \log p(C \mid \theta)} d\theta \qquad (4)$$

Performing a Taylor expansion of equation (4) around $\epsilon = 0$ results in:

$$F(\epsilon, g(\theta)) := -\epsilon \mathbb{E}_{g(\theta)}[\log p(\mathcal{C} \mid \theta)] + \mathcal{O}(\epsilon^2)$$

Applying this to equation (3) above gives the approximate log density ratio $\hat{r}(C)$:

$$\hat{r}(\mathcal{C}) := \mathbb{E}_{p(\theta \mid \mathcal{D})}[\log p(\mathcal{C} \mid \theta)] - \mathbb{E}_{p(\theta \mid \mathcal{D}, \mathcal{F})}[\log p(\mathcal{C} \mid \theta)]$$

This can be further approximated as discussed above as the sum of individual log density ratios, where each term is given by:

$$\hat{r}(z) := \mathbb{E}_{p(\theta \mid \mathcal{D})}[\log p(z \mid \theta)] - \mathbb{E}_{p(\theta \mid \mathcal{D}, \mathcal{F})}[\log p(z \mid \theta)] \qquad (5)$$

This corresponds to the above-mentioned detrimental effect of a training data item z. In the above E represents the average or mean for the value in square brackets, when sampling values for parameters theta from the distribution in subindex.

In one example, the posterior p(θ|D, F) may be estimated from p(θ|D), rather than independently estimating p(θ|D, F). An estimated or approximate posterior may be represented herein as with the function q. The estimation may be carried out using a linear influence function. If the model is trained on data D with parameters $\hat{\theta}$, which corresponds to an approximation of MLE/MAP estimates, i.e. $q(\theta) = \delta(\theta - \hat{\theta}) \approx p$ (θ|D). After observing the set of failures F, a point estimate p(θ|D, F) can be obtained by performing a single update of natural gradient ascent on the log likelihood of F with a step size γ>0. The natural gradient ascent is disclosed in Amari, Shun-Ichi. "Natural gradient works efficiently in learning." Neural computation 10.2 (1998): 251-276, the contents of which are incorporated herein by reference in their entirety.

In an alternative example, a continual learning technique may be applied to estimate p(θ|D, F) from p(θ|D). For example, the posterior p(θ|D, F) may be estimated using Elastic Weight Consolidation (EWC). EWC is disclosed in Kirkpatrick, James, et al. "Overcoming catastrophic forgetting in neural networks." Proceedings of the national academy of sciences 114.13 (2017): 3521-3526, the contents of which are incorporated herein by reference in their entirety.

Particularly, EWC approximates p(θ|D, F) by first performing a Laplace approximation of the original posterior p(θ|D) around a point estimate $\hat{\theta}$, and subsequently finding the MAP solution of θ.

The method may then include maximizing the objective below with respect to θ, for example using stochastic gradient descent:

$$\log p(\mathcal{F} \mid \theta) - \frac{N}{2}(\theta - \hat{\theta})^T \hat{F}_{\hat{\theta}}(\theta - \hat{\theta}) - \frac{\lambda}{2}\|\theta - \hat{\theta}\|_2^2$$

Returning to FIG. 2, in one example, the method further comprises a step of S203 of updating the machine learning model to remove an effect of the identified training data item or items. In other words, the model is corrected or repaired so as to remove the influence of the identified training data item(s).

Expressed differently, this may be considered the computation of the posterior p(θ|D\C) under the assumption that C is absent from the training data D.

In one example, the model may be updated by re-initialising the model, removing the identified training data items from the training data, and retraining the model. The posterior p(θ|D\C) can then be calculated from the retrained model.

However, this approach may be resource intensive. In addition, the estimated posterior of the retrained model may be unrelated to the original posterior. This may result in the retrained model not maintaining other good properties of the original model. Accordingly, in other examples the estimation of the posterior can be treated as a continual learning problem, where the task is to "unlearn" the datapoints in C while using the posterior distribution p(θ|D) as the prior. This can be carried out as follows:

$$q_{D \setminus C}^{**}(\theta) \propto q(\theta)/p(\mathcal{C} \mid \theta) \approx p(\theta \mid \mathcal{D} \setminus \mathcal{C})$$

This approximation can be carried out with approximate inference techniques such as MLE/MAP point estimate, Laplace approximation (also disclosed in the aforementioned Kirkpatrick et al publication) or variational inference (disclosed in Nguyen, Cuong V., et al. "Variational continual learning." arXiv preprint arXiv:1710.10628 (2017), the contents of which are incorporated by reference in their entirety).

In one example, the model can be updated by fine tuning the model on the corrected data. In contrast to retraining the model, fine tuning the model is accomplished by continuing to train the model on the training data set with the identified training data items removed. In this instance, the properties of the earlier model can be maintained.

In another example, the model can be updated using Newton update removal, disclosed in Guo, C., Goldstein, T., Hannun, A., and van der Maaten, L. Certified data removal from machine learning models. arXiv preprint arXiv: 1911.03030, 2019, the contents of which are incorporated by reference in their entirety. In Newton update removal, information about the identified training data items is deleted by performing a single-step natural gradient descent on their log likelihood.

In a further example, EWC can be used to update the model. In one example, EWC is used to maximise the following objective:

$$\log p(C \mid \theta) - \frac{N}{2}(\theta - \hat{\theta})^T \hat{F}_{\hat{\theta}}(\theta - \hat{\theta}) - \frac{\lambda}{2}\|\theta - \hat{\theta}\|_2^2$$

Wherein the first term seeks to remove information about C, while the remaining terms discourage parameters from deviating from the original values.

It will be understood that the techniques discussed above are example techniques for updating the model to remove the effect of the identified training data items C from the model, and that other techniques may be employed. For example, other continual learning techniques may be applied.

The techniques discussed herein may result in the replacement of one, some or all of the original parameters θ of the model derived during the original training process with new parameters that are reflective of the removed effect of the identified training data items C. That is to say, the output of step S203 may be a new set of model parameters.

Once updated, the model may again be used for inference, for example as discussed herein with reference to FIG. 1.

Figure 4:
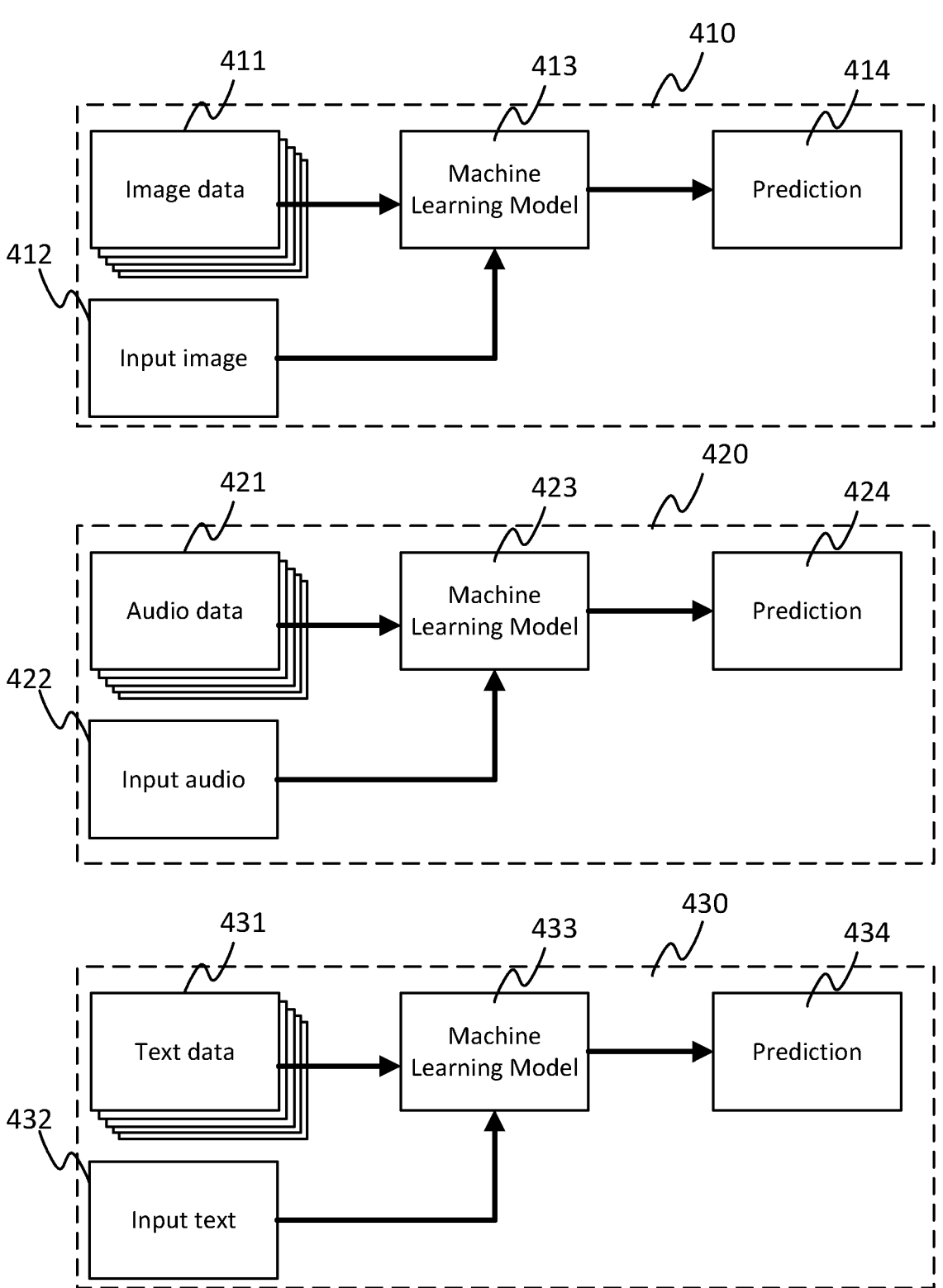
FIG. 4 is a schematic diagram illustrating example machine learning systems.

Turning now to FIG. 4, applications of the supervised machine learning models discussed herein are illustrated.

A first application 410 is an image analysis task or computer vision. Accordingly, the training data 411 and input data 412 are images. The trained model 413 may used for object recognition, in which case the output prediction 414 may be an object label or category.

In one example, the task may be identifying handwritten digits in images. The training data 411 may comprise the MNIST (Modified National Institute of Standards and Technology) database (https://deepai.org/dataset/mnist). In another example, the model 413 may be trained for object detection using the CIFAR-10 dataset (https://www.cs.toronto.edu/~kriz/cifar.html).

In other examples, the model may be used for image segmentation, or any other image processing task. The images may be domain specific. For example, the trained model may be used to process medical images, for example to identify anatomical structures.

A second application 420 is an audio processing task. Accordingly, the training data 421 and input data 422 are audio data. For example, the model may be configured to process speech. The model 423 may be trained for speech recognition, in which case the output 424 may be text generated from the input audio. In other examples, the model 423 may be trained for speaker recognition, or any other suitable audio processing problem.

A third application 430 is a text processing task. Accordingly, the training data 431 and input data 432 are text data. For example, the model may be configured for machine translation, relation extraction, question answering, sentiment analysis or any other suitable task.

In other examples, the models and techniques disclosed herein may be applied to other types of data, such as graph data, genomic data and so on.

In still further examples, the models and techniques may be applied to tabular data or numerical data. For example, the data may be medical data (e.g. derived from blood samples or other samples), from which a diagnosis is made.

The techniques discussed herein provide a means of automatically identifying poor training data. Advantageously, time consuming manual troubleshooting of poor performance can be avoided. This may be particularly helpful in domains where it is difficult to visualize the training data or effectively manually inspect the training data to identify poor quality data. For example, in the processing of genomic data or tabular or numerical data, it can be difficult to readily identify annotation errors.

Furthermore, the techniques discussed herein provide a means of automatically correcting the trained model to remove the impact of the poor training data. This in turn avoids the need to manually design fixes, engage in further training data collection or the like. Some examples provide efficient means of correcting the model without requiring wholesale reinitialization and retraining, saving computational resource and memory usage, and also avoiding the potential unpredictability associated with retraining. This can be particularly helpful in settings where it is key that the properties of the original model are retained, such as in medical settings where a system including the model has undergone regulatory approval or other similar testing.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Set out below are optional features of the first aspect of the disclosure discussed in the summary above.

The method may comprise updating the machine learning model to remove an effect of the training data item.

Determining the impact on performance of the trained machine learning model associated with removing the training data item from the plurality of training data may comprise determining an impact on a posterior probability distribution of the trained machine learning model.

Identifying the training data item that is the cause of the incorrect prediction may comprise: calculating a first posterior probability distribution corresponding to the machine learning model; calculating a second posterior distribution corresponding to the machine learning model with a candidate training data item, suitably a plurality of candidate training data items, removed; comparing the first posterior probability distribution and second posterior probability distribution to determine a detrimental impact of removing the candidate training data item. Identifying the training data item that is the cause of the incorrect prediction may comprise selecting a candidate training data item with the maximum impact as the cause of the incorrect prediction. In some examples, calculating a posterior probability distribution (i.e. one of the first, second, third or fourth posterior probability distribution discussed herein) comprises estimating the posterior probability distribution.

The method may comprise: determining the detrimental impact of each training data item in the training data items, and selecting a plurality of the training data items with greatest detrimental impact as the cause of the incorrect prediction. The method may comprise selecting the top K training data items with greatest detrimental impact. K may be in the range of from 1 to 1000, from 1 to 500, from 1 to 100, suitably from 1 to 50, suitably from 1 to 20, suitably K may be 10. Determining the detrimental impact of each training data item may comprise calculating a third posterior distribution corresponding to the machine learning model with the incorrect predictions added to the training data items. The third posterior distribution may be estimated from the first posterior distribution. The third posterior distribution may be estimated using a linear influence function. The third posterior distribution may be estimated using a continual learning method. The continual learning method may be Elastic Weight Consolidation.

Updating the machine learning model may comprise: reinitializing the model, removing the identified training data item from the plurality of training data items to generate a revised training data set, and retraining the model on the revised training data set.

Updating the machine learning model may comprise fine tuning the model on the identified training data item.

Updating the machine learning model may comprise calculating a fourth posterior distribution corresponding to the machine learning model with the identified training data item removed from the plurality of training data items. The fourth posterior distribution may be estimated from the first posterior distribution. The fourth posterior distribution may be estimated using Newton update removal. The fourth posterior distribution may be estimated using Elastic Weight Consolidation.

The method may comprise receiving user input identifying the incorrect prediction. The method may comprise identifying the incorrect prediction based on a stored label associated with input data from which the incorrect prediction is generated.

The method may comprise: receiving an input data item, and using the updated machine learning model to generate a prediction from the input data item.

The machine learning model may be an image analysis model. The training data items may comprise images. The image analysis model may be an object recognition model. The incorrect prediction may be an incorrect object label or category. The image analysis model may be an image segmentation model.

The machine learning model may be an audio analysis model. The training data items may comprise audio data. The audio analysis model may be a speech processing model. The incorrect prediction may be an incorrect text generated from input audio data.

The machine learning model may be a text processing model. The training data items may comprise text. The text processing model may be a machine translation model, a relation extraction model, a question answering model or a sentiment analysis model.

In some examples, the method does not comprise training the trained machine learning model and/or may be performed on a separate device or at a separate time to the training of the trained machine learning model. Similarly, in some examples, the method may not comprise the step of outputting the incorrect prediction by the trained model, which may be performed on a separate device or at a separate time to the other steps defined herein. Put differently, in some examples the method may be provided with the trained model and/or incorrect predictions as inputs.

In other examples, the methods may comprise training the trained machine learning model and/or performing inference using the trained machine learning model to generate the incorrect prediction. Again, these steps may be performed on different devices, or on the same device.

Performance in the context of this disclosure may refer to the ability of the trained model to provide correct predictions at inference time (i.e. when the model is executed). The impact on performance discussed herein may refer to a change or the amount of a change in some measurement of performance, such as on the posterior probability distribution (or an estimate thereof).

According to a second aspect disclosed herein, there is provided a system comprising a processor and a memory, the memory storing computer-readable instructions that, when executed by the processor cause the system to perform any of the methods disclosed herein.

According to a third aspect disclosed herein, there is provided a tangible non-transient computer-readable storage medium having recorded thereon instructions that, when executed by a computer device cause the computer device to perform any of the methods disclosed herein.

The optional features set out above in relation to the first aspect may be combined with the second and/or third aspect in any combination.

In another example, the disclosure extends to a computer-implemented method comprising: receiving an incorrect prediction of a trained machine learning model, the trained machine learning model based on a plurality of training data items; and identifying a training data item of the plurality of training data items that is a cause of the incorrect prediction. The method may include identifying the training data item that is the cause of the incorrect prediction by identifying a performance improvement of the trained machine learning model associated with removing the training data item from the plurality of training data.

Reference is made herein to data storage for storing data. This may be provided by a single device or by plural devices. Suitable devices include for example a hard disk and non-volatile semiconductor memory (e.g. a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A system for saving computational resource and memory usage while ensuring that a previous property of a trained machine learning model is retained, the system comprising a processor and a memory, the memory storing computer-readable instructions that, when executed by the processor, cause the system to:

receive an incorrect prediction of the trained machine learning model, the trained machine learning model based on a plurality of training data items;

select a training data item of the plurality of training data items;

calculate an estimate of an impact on performance of the trained machine learning model in respect of the incorrect prediction, the impact caused by removing the selected training data item from the plurality of training data items, wherein the estimate of the impact is calculated by:

calculating a first posterior probability distribution corresponding to the trained machine learning model;

calculating a second posterior distribution corresponding to the trained machine learning model with the selected training data item removed; and comparing the first posterior probability distribution and second posterior probability distribution to determine the estimate of the impact;

determine that the impact on performance indicates an improvement in performance of the trained machine learning model;

identify the selected training data item as a cause of the incorrect prediction based on the calculated estimate of the impact on performance indicating improvement in performance of the trained machine learning model; and automatically correct the trained machine learning model to remove an effect of the selected training data item without requiring entire retraining of the trained machine learning model.

2. The system of claim 1, wherein the computer-readable instructions that cause the system to calculate the estimate of the impact on performance of the trained machine learning model comprises instructions that, when executed by the processor, determine an impact on the first posterior probability distribution of the trained machine learning model.

3. The system of claim 1, wherein the trained machine learning model is corrected by unlearning datapoints in the selected training data item.

4. The system of claim 1, comprising instructions that, when executed by the processor, cause the system to:

determine a detrimental impact on performance of the trained machine learning model of each training data item in the plurality of training data items, and select one or more of the plurality of training data items with greatest detrimental impact as the cause of the incorrect prediction.

5. The system of claim 4, wherein the computer-readable instructions that cause the system to determine the detrimental impact of each training data item comprises instructions that, when executed by the processor, cause the system to:

calculate a third posterior distribution corresponding to the trained machine learning model with the incorrect prediction added to the plurality of training data items, wherein the third posterior distribution is estimated from the first posterior probability distribution corresponding to the trained machine learning model.

6. The system of claim 5, comprising instructions that, when executed by the processor, cause the system to estimate the third posterior distribution using a linear influence function.

7. The system of claim 3, wherein the datapoints in the selected training data item are unlearned while using the first posterior probability distribution as a prior.

8. A computer-implemented method for saving computational resource and memory usage while ensuring that a previous property of a trained machine learning model is retained, the method comprising:

receiving an incorrect prediction of the trained machine learning model, the trained machine learning model based on a plurality of training data items;

selecting a training data item of the plurality of training data items;

calculating an estimate of an impact on performance of the trained machine learning model in respect of the incorrect prediction, the impact caused by removing the selected training data item from the plurality of training data items, wherein the estimate of the impact is calculated by:

calculating a first posterior probability distribution corresponding to the trained machine learning model;

calculating a second posterior distribution corresponding to the trained machine learning model with the selected training data item removed; and comparing the first posterior probability distribution and second posterior probability distribution to determine the estimate of the impact;

determining that the impact on performance indicates an improvement in performance of the trained machine learning model;

identifying the selected training data item as a cause of the incorrect prediction based on the calculated estimate of the impact on performance indicating improvement in performance of the trained machine learning model; and automatically correcting the trained machine learning model to remove an effect of the selected training data item without requiring entire retraining of the trained machine learning model.

9. The method of claim 8, wherein the trained machine learning model is one of an image analysis model, an audio analysis model, or a text processing model.

10. The method of claim 8, wherein calculating the estimate of the impact on performance of the trained machine learning model comprises determining an impact on the first posterior probability distribution of the trained machine learning model.

11. The method of claim 8, wherein the trained machine learning model is corrected by unlearning datapoints in the selected training data item.

12. The method of claim 11, wherein the datapoints in the selected training data item are unlearned while using the first posterior probability distribution as a prior.

13. The method of claim 8, wherein correcting the trained machine learning model comprises fine tuning the trained machine learning model on the identified selected training data item.

14. The method of claim 8, wherein correcting the trained machine learning model comprises:

calculating a third posterior distribution corresponding to the trained machine learning model with the identified selected training data item removed from the plurality of training data items, wherein the third posterior distribution is estimated from the first posterior probability distribution corresponding to the trained machine learning model.

15. The method of claim 8, comprising:

receiving an input data item, and using the corrected trained machine learning model to generate a prediction from the input data item.

16. A tangible non-transient computer-readable storage medium for saving computational resource and memory usage while ensuring that a previous property of a trained machine learning model is retained, the computer-readable storage medium having recorded thereon instructions that, when executed by a computer device cause the computer device to:

receive an incorrect prediction of the trained machine learning model, the trained machine learning model based on a plurality of training data items;

select a training data item of the plurality of training data items;

calculate an estimate of an impact on performance of the trained machine learning model in respect of the incorrect prediction, the impact caused by removing the selected training data item from the plurality of training data items, wherein the estimate of the impact is calculated by:

calculating a first posterior probability distribution corresponding to the trained machine learning model;

calculating a second posterior distribution corresponding to the trained machine learning model with the selected training data item removed; and comparing the first posterior probability distribution and second posterior probability distribution to determine the estimate of the impact;

determine that the impact on performance indicates an improvement in performance of the trained machine learning model;

identify the selected training data item as a cause of the incorrect prediction based on the calculated estimate of the impact on performance indicating improvement in performance of the trained machine learning model; and automatically correct the trained machine learning model to remove an effect of the selected training data item without requiring entire retraining of the trained machine learning model.

17. The tangible non-transient computer-readable storage medium of claim 16, wherein the trained machine learning model is one of an image analysis model, an audio analysis model, or a text processing model.

18. The tangible non-transient computer-readable storage medium of claim 16, wherein calculating the estimate of the impact on performance of the trained machine learning model comprises determining an impact on the first posterior probability distribution of the trained machine learning model.

19. The tangible non-transient computer-readable storage medium of claim 16, wherein the trained machine learning model is corrected by unlearning datapoints in the selected training data item.

20. The tangible non-transient computer-readable storage medium of claim 16, comprising instructions to:

determine a detrimental impact on performance of the trained machine learning model of each training data item in the plurality of training data items, and select one or more of the plurality of training data items with greatest detrimental impact as the cause of the incorrect prediction.

* * * * *